US008837311B2

(12) United States Patent
Martin et al.

(10) Patent No.: US 8,837,311 B2
(45) Date of Patent: Sep. 16, 2014

(54) METHOD AND APPARATUS FOR RESELECTING A DIFFERENT TRANSMISSION TIME INTERVAL RESOURCE

(75) Inventors: Brian Martin, Farnham (GB); Keiichi Kubota, Webridge (GB)

(73) Assignee: Broadcom Corporation, Irvine, CA (US)

( * ) Notice: Subject to any disclaimer, the term of this patent is extended or adjusted under 35 U.S.C. 154(b) by 287 days.

(21) Appl. No.: 13/291,634

(22) Filed: Nov. 8, 2011

(65) Prior Publication Data

US 2013/0114401 A1    May 9, 2013

(30) Foreign Application Priority Data

Nov. 7, 2011 (GB) .................................. 1119153.3

(51) Int. Cl.
*H04J 1/16* (2006.01)
*H04W 72/08* (2009.01)
*H04W 52/48* (2009.01)
*H04W 28/04* (2009.01)

(52) U.S. Cl.
CPC ............ *H04W 52/48* (2013.01); *H04W 72/085* (2013.01)
USPC ............................ 370/252; 370/329; 370/282

(58) Field of Classification Search
CPC ............ H04W 28/04; H04W 72/0413; H04W 2001/125; H04W 1/0001
USPC .......................................... 370/252, 329, 282
See application file for complete search history.

(56) References Cited

U.S. PATENT DOCUMENTS

| 2004/0214590 A1 | 10/2004 | Al-Housami et al. |
| 2006/0164981 A1* | 7/2006 | Olsson et al. ................. 370/229 |
| 2007/0047485 A1 | 3/2007 | Gorokhov et al. |
| 2013/0170444 A1* | 7/2013 | Pani et al. ..................... 370/329 |

FOREIGN PATENT DOCUMENTS

| EP | 1 755 355 A1 | 2/2007 |
| EP | 2 015 601 A1 | 1/2009 |
| WO | WO 2006/038066 A2 | 4/2006 |
| WO | WO-2010/034354 | 4/2010 |

OTHER PUBLICATIONS

"Correction of the PRACH and RACH TTI selection procedure;" Siemens AG; 3GPP TSG-RAN2 Meeting #32; R@-022576; dated Sep. 2002.
"E-DCH Coverage and switching between 2ms and 10ms TI;" Motorola; TSG RAN WG1 Meeting #38-bis; R1-041224; dated Sep. 2004.

(Continued)

*Primary Examiner* — John Pezzlo
(74) *Attorney, Agent, or Firm* — Stanton IP Law

(57) ABSTRACT

A method, apparatus and computer program product are provided in order to allow for reselection of a TTI resource, such as in an instance in which a mobile terminal has moved to a different portion of the coverage area and/or in an instance in which the TTI resource was initially incorrectly selected, such as based upon an inaccurate measurement. In the context of a method, a first TTI resource is selected in conjunction with an uplink. The method also detects a failure condition associated with the uplink and selects a second TTI resource, different than the first TTI resource, in response to detection of the failure condition.

24 Claims, 5 Drawing Sheets

(56) References Cited

OTHER PUBLICATIONS

International Search Report and Written Opinion for Application No. PCT/IB2012/056192; dated Mar. 1, 2013.
Combined Search and Examination Report from Great Britain Patent Application No. 1119153.3, dated Mar. 2, 2012.
U.S. Appl. No. 13/251,685, filed Oct. 3, 2011.
U.S. Appl. No. 13/251,376, filed Oct. 3, 2011.
Transmission Time Interval—Wikipedia, the free encyclopedia; Downloaded on Oct. 31, 2011 from http://en.wikipedia.org/wiki/Transmission_Time_Interval.
"On the Merits of Fallback to R99"; Agenda Item 10.1.4; Qualcomm Incorporated; 3GPP TSG RAN WG2 Meeting #75; Athens, GR, Aug. 22-26, 2011, pp. 1-11.
"On concurrent deployment of 2ms and 10ms TTI in a cell in CELL_FACH"; Agenda Item 10.1.3; Qualcomm Incorporated; 3GPP TSG RAN WG2 Meeting #75-BIS; Zhuhai, CN, Oct. 10-14, 2011, pp. 1-17.
3GPP TS 25.319 V7.7.0 (Jun. 2009); $3^{rd}$ Generation Partnership Project; Technical Specification Group Radio Access Network; Enhanced uplink; Overall description; Stage 2 (Release 7).
3GPP TS 25.214 V10.4.0 (Sep. 2011); $3^{rd}$ Generation Partnership Project; Technical Specification Group Radio Access Network; Physical layer procedures (FDD); (Release 10).

* cited by examiner

METHOD AND APPARATUS FOR RESELECTING A DIFFERENT TRANSMISSION TIME INTERVAL RESOURCE

CROSS REFERENCE TO RELATED APPLICATION

This application claims the benefit of United Kingdom patent application number 1119153.3, filed on Nov. 7, 2011.

TECHNOLOGICAL FIELD

A method, apparatus and computer program product are provided according to an example embodiment for reselecting a different transmission time interval (TTI) resource and, more particularly, for selecting a different TTI resource in response to the detection of a failure condition associated with the uplink.

BACKGROUND

The communications between a mobile terminal and a serving cell, such as the uplink (UL) communications from the mobile terminal to the serving cell, may sometimes affect resource utilization, throughput, latency and coverage. To enhance UL improvements, the ongoing evolution of wireless communications systems such as, for example the enhanced dedicated channel (E-DCH) in CELL_FACH state feature was introduced into wireless standard specifications, such as the third generation partnership project (3GGP) Release 8 specifications.

Mobile terminals operating in a CELL_FACH mode may use a contention based E-DCH channel for UL transmission rather than a traditional random access channel (RACH). The contention-based E-DCH channel allows for mobile terminals to transfer signaling and data at significantly higher data rates and for longer durations, which reduces transfer and state transition delays.

In order to limit errors due to fading and interference on the uplink from a mobile terminal (also known as user equipment) to the network, data may be divided into blocks with the bits within a block being encoded and interleaved. The size of a block is related to a transmission time interval (TTI) as each block must be transmitted within the TTI. Upon receipt of a block, a network entity may de-interleave and decode the bits and may then estimate the bit error rate as a result of the transmission of the block within the TTI. The TTI is therefore the shortest period over which the network entity can estimate the bit error rate. In networks that utilize link adaptation techniques based on the estimated bit error rate, the shortest interval between reports of the estimated performance, that is, between reports of the bit error rate, is a single TTI. Thus, the length of the TTI generally limits a network's responsiveness in adapting to changed conditions on the uplink. In order to adapt more quickly to the changing conditions on an uplink, shorter TTIs may be desired. However, the desire for short TTIs may be offset by the increased efficiencies in error correction and compression techniques and the increased benefits from interleaving that are provided by longer TTIs.

Various TTIs have been defined including a 10 ms TTI and a 2 ms TTI. For example, support for concurrent deployment of TTI settings, (e.g., 2 ms and 10 ms), will be allowed for the common E-DCH in the CELL_FACH state. In this regard, 3GGP Release 11 (Rel-11) supports concurrent deployment of 2 ms and 10 ms TTI settings in a cell. A single TTI setting, which may be determined and broadcast by a communications network, may be used by mobile terminals accessing the E-DCH in the CELL_FACH state within a particular cell.

The 2 ms TTI allows for a quicker adaptation to uplink conditions, thereby allowing the transmission of data blocks to be quickly scheduled while the uplink is temporarily enjoying improved conditions. As a result, a 2 ms TTI may allow data to be transmitted over an uplink having better than average conditions such that the bit rate transmitted via the uplink may be higher than that allowed by average conditions, thereby correspondingly increasing the network capacity. However, a smaller TTI, such as a 2 ms TTI, may only be workable in an instance in which the mobile terminal or other user equipment is located within a central portion of a coverage area since a mobile terminal or other user equipment near the edge of the coverage area may be unable to successfully transmit data in accordance with the smaller TTI.

Thus, in an instance in which a smaller TTI was initially selected, such as in an instance in which the mobile terminal was within a central region of the coverage area at the time that the smaller TTI was selected, the mobile terminal may need to switch to a longer TTI in an instance in which the mobile terminal moves so as to be closer to the edge of the coverage area. Additionally, the initial selection of the TTI may, in some instances, be based upon an inaccurate measurement such that the initial selection of a smaller TTI may be incorrect, thereby creating an immediate desire to switch to a longer TTI.

BRIEF SUMMARY

A method, apparatus and computer program product are provided in accordance with an example embodiment of the present invention in order to allow for reselection of a TTI resource. As such, the method, apparatus and computer program product of one embodiment may provide for the reselection of a TTI resource in an instance in which a mobile terminal has moved to a different portion of the coverage area and/or in an instance in which the TTI resource was initially incorrectly selected, such as based upon an inaccurate measurement. As such, the method, apparatus and computer program product of an example embodiment of the present invention provides for adaptation of the TTI resource so as to provide for improved efficiency in regards to the transmission of data via an uplink.

In one embodiment, a method is provided that includes selecting a first TTI resource in conjunction with an uplink. The method of this embodiment also detects a failure condition associated with the uplink and selects a second TTI resource, different than the first TTI resource, in response to detection of the failure condition.

In another embodiment, an apparatus is provided that includes at least one processor and at least one memory including program instructions with the at least one memory and the program instructions being configured to, with the at least one processor, cause the apparatus to at least select a first TTI resource in conjunction with an uplink. The at least one memory and the program instructions are also configured to, with the at least one processor, cause the apparatus to detect a failure condition associated with the uplink and to select a second TTI resource in response to the detection of the failure condition. In this regard, the second TTI resource is different than the first TTI resource.

In the further embodiment, a computer program product is provided that includes at least one-transitory computer-readable storage medium having computer-readable program instructions stored therein with the computer-readable program instructions including program instructions configured to select a first TTI resource in conjunction with an uplink. The computer-readable program instructions also include program instructions configured to detect a failure condition associated with the uplink and program instructions configured to select a second TTI resource in response to the detection of the failure condition. In this regard, the second TTI resource is different than the first TTI resource.

In yet another embodiment, an apparatus is provided that includes means for selecting a first TTI resource in conjunction with an uplink. The apparatus of this embodiment also includes means for detecting a failure condition associated with the uplink and means for selecting a second TTI resource, different than the first TTI resource, in response to detection of the failure condition.

BRIEF DESCRIPTION OF THE DRAWINGS

Figure 1:
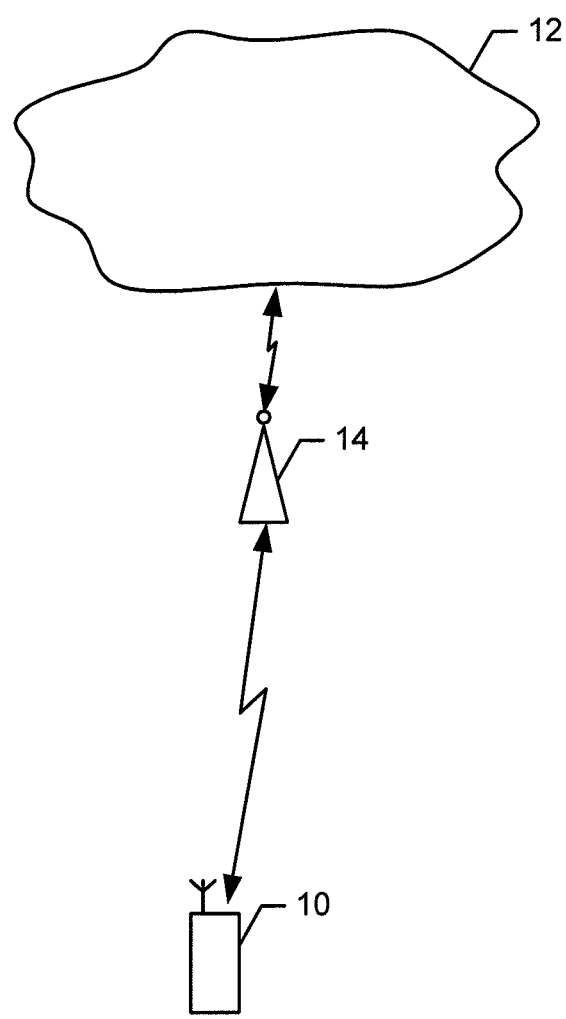
Figure 2:
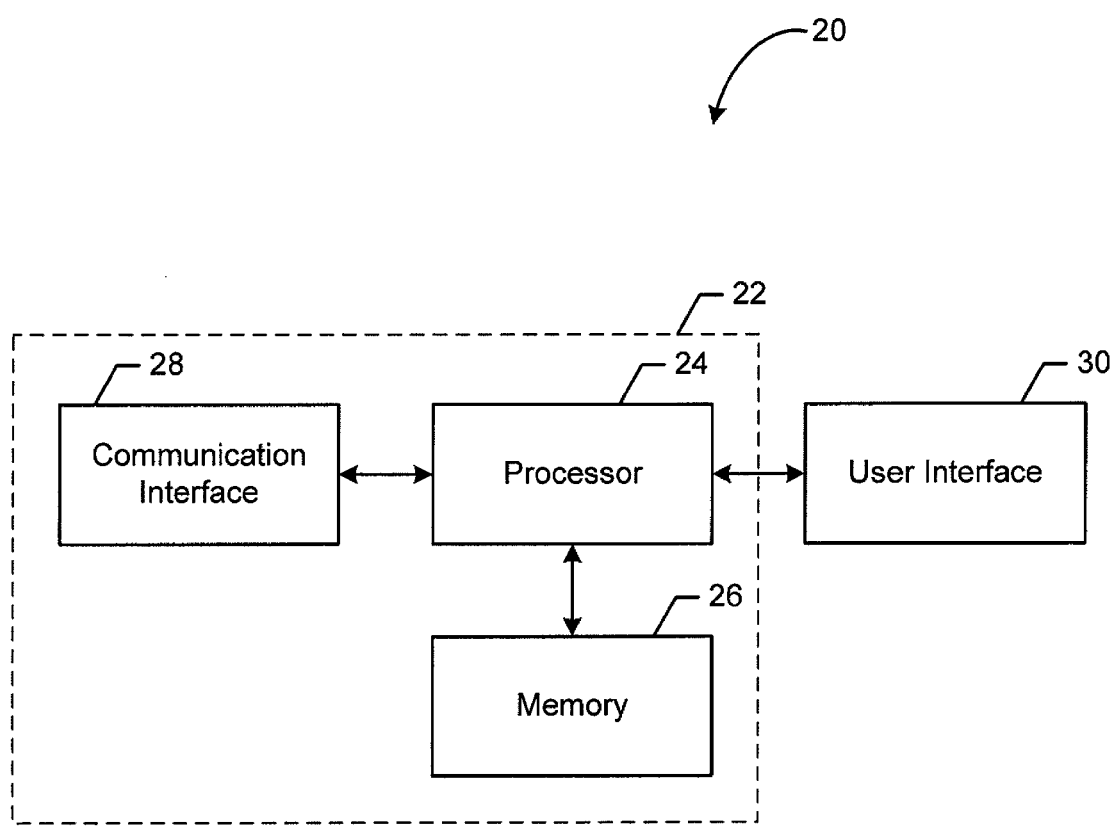
Figure 3:
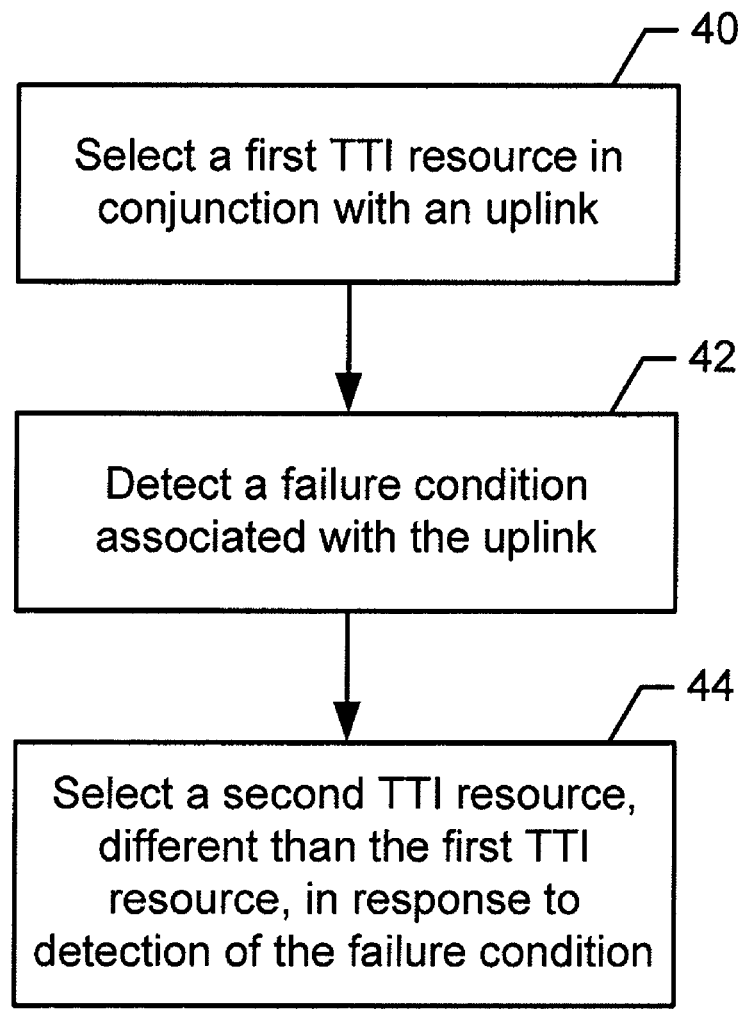
Figure 4:
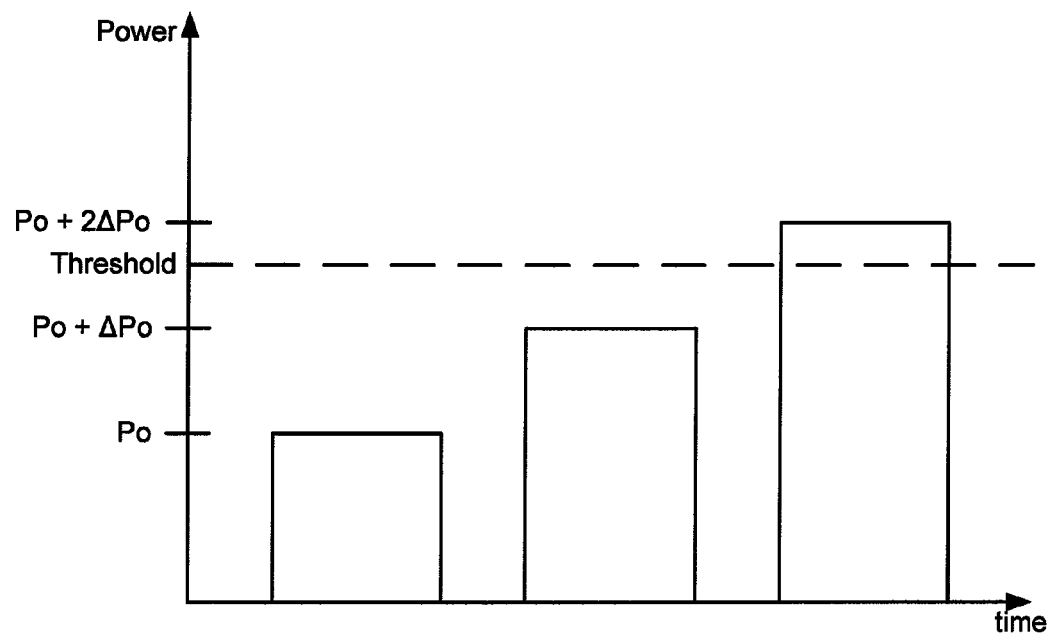
Figure 5:
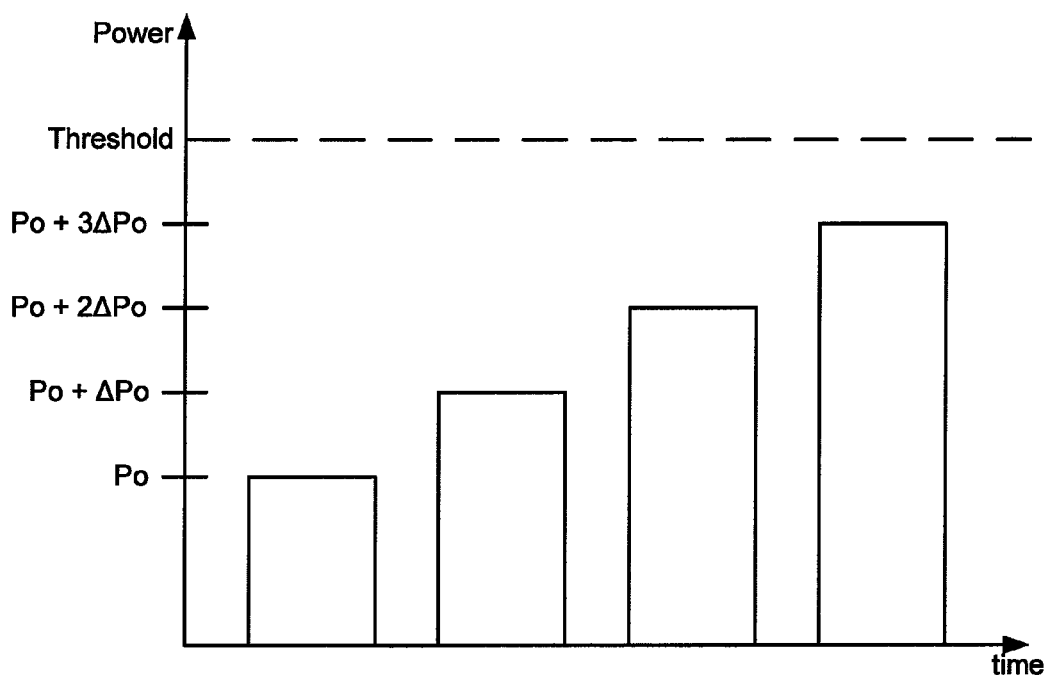
Figure 6:
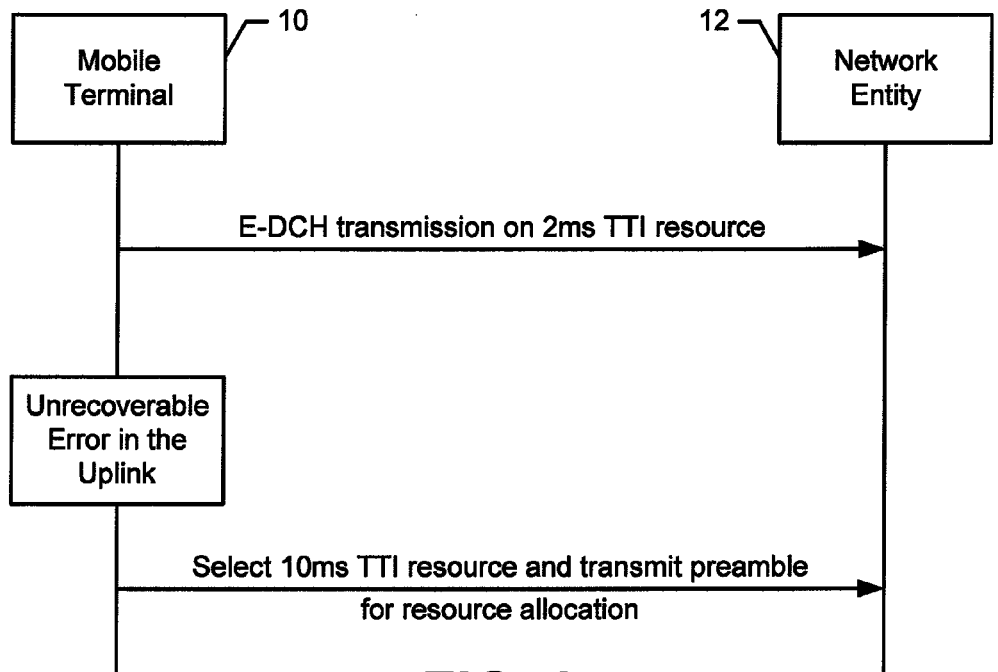
Figure 7:
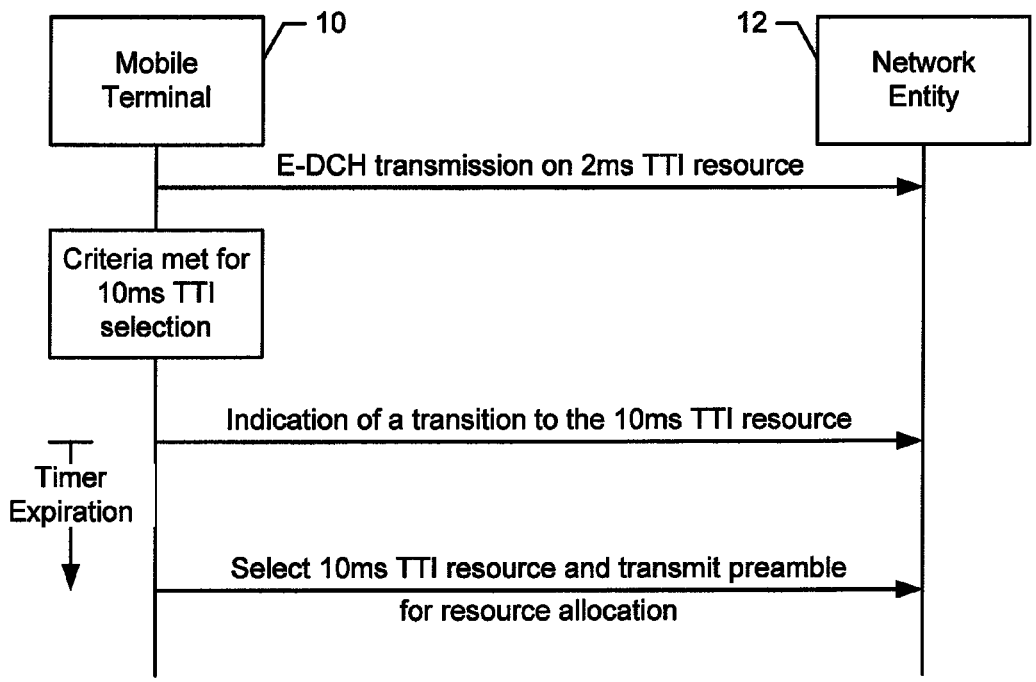

Having thus described example embodiments of the invention in general terms, reference will now be made to the accompanying drawings, which are not necessarily drawn to scale, in wherein:

FIG. 1 is a schematic representation which may support reselection of a TTI resource in conjunction with the transmission of data via an uplink in accordance with an example embodiment of the present invention;

FIG. 2 is a block diagram of an apparatus that they me embodied by a mobile terminal in accordance with an example embodiment of the present invention;

FIG. 3 is a flowchart illustrating operations performed in accordance with an example embodiment of the present invention;

FIG. 4 is a graphical representation of an increase in preamble power to a power level that no longer satisfies the predefined threshold and that serves as a failure condition for triggering reselection of a TTI resource in accordance with an example embodiment of the present invention;

FIG. 5 is a graphical representation of the retransmission of the preamble a predefined number of times which represents a failure condition so as to trigger reselection of a TTI resource in accordance with an example embodiment of the present invention;

FIG. 6 is signal flow diagram in which an unrecoverable error in the uplink serves as a failure condition so as to trigger selection of a different TTI resource in accordance with an example embodiment of the present invention; and FIG. 7 is signal flow diagram in which the failure to receive a response from the network relating to a transition from one TTI resource to another TTI resource serves as the failure condition so as to trigger the selection of a different TTI resource in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided in accordance with an example embodiment of the present invention in order to allow for the reselection of a TTI resource, such as in an instance in which a mobile terminal has moved to a different portion of the coverage area and/or in an instance in which the TTI resource was initially incorrectly selected, such as based upon an inaccurate measurement. As such, the method, apparatus and computer program product of an example embodiment of the present invention provides for adaptation of the TTI resource so as to provide for improved efficiency in regards to the transmission of data via an uplink.

Although the method, apparatus and computer program product may be implemented in a variety of different systems, one example of such a system is shown in FIG. 1, which includes a first communication device (e.g., mobile terminal 10) that is capable of communication via a network entity 12, such as an access point, e.g., a base station, a Node B, an evolved Node B (eNB), serving cell or other access point, with a network 14 (e.g., a core network). While the network may be configured in accordance with Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, supported by respective access points, each of which may serve a respective coverage area. The cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the network entity 12, e.g., an access point, and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, the mobile terminal 10 may be embodied as or otherwise include an apparatus 20 as generically represented by the block diagram of FIG. 2. While the apparatus 20 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a communication interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The communication interface 28 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the network entity 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

FIG. 3 is a flowchart illustrating the operations performed by a method, apparatus and computer program product, such as apparatus 20 of FIG. 2, from the perspective of a mobile terminal 10 in accordance with one embodiment of the present invention is illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry 22, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Referring now to FIG. 3, the operations performed by a method, apparatus and computer program product of an example embodiment are illustrated. As shown by block 40, an apparatus 20 embodied by the mobile terminal 10 may include means, such as the processing circuitry 22, the processor 24 or the like, for selecting a first transmission time interval (TTI) resource in conjunction with an uplink. The first TTI resource defines a respective time period and, in one example embodiment, is a 2 ms TTI resource that defines a time period of 2 ms in which to transmit a block of data via the uplink to a network entity 12, such as an access point or the like. The first TTI resource may be configured for either normal operation or for bundling operation. In regards to normal operation, a data packet is transmitted a single time via the uplink to a network entity within the first TTI. Following transmission of the block of data within the first TTI, the mobile terminal may await an acknowledgement from the network entity indicative of the successful receipt of the block of data. In accordance with a bundling operation, however, the same block of data may be transmitted via the uplink a predefined number of times with each transmission of the block of data being performed within a time period defined by the first TTI. A bundling operation therefore transmits the same block of data multiple times without waiting for an acknowledgment from the network entity until the block of data has been transmitted the predefined number of times. Thus, a bundling operation increases the likelihood that the block of data is successfully received by the network entity, albeit at the expense of the transmission rate.

The first TTI resource may be selected in various manners. In one embodiment, the selection of the first TTI resource is based upon the power with which the preamble is transmitted by the mobile terminal 10 to the network entity 12, such as via a random access channel (RACH), a physical random access channel (PRACH) or the like, in order to establish a dedicated channel, such as an E-DCH, to support communications therewith. The power with which the preamble is transmitted via the uplink may, in turn, be based upon an estimation of the interference or path loss along the uplink. As such, the selection of the first TTI resource may additionally or alternatively be based upon the interference and/or the path loss along the uplink from the mobile terminal to the network entity.

The power with which the preamble is transmitted via the uplink generally varies based upon the estimated interference and/or path loss along the uplink with the preamble being transmitted with greater power in an instance in which the estimated interference and/or path loss is greater, such as in instances in which the mobile terminal 10 is near an edge of a coverage area, e.g., a cell. Conversely, the preamble is generally transmitted with lower power in an instance in which the estimation of the interference and/or path loss is less, such as in an instance in which the mobile terminal is within a central portion of the coverage area.

In instances in which the first TTI resource is the smaller or shorter TTI resource, such as a 2 ms TTI resource, relative to the second TTI resource that will be discussed below, the apparatus 20, such as the processing circuitry 22, the processor 24 or the like, may be configured to select the smaller TTI resource in an instance in which the power with which the preamble is transmitted via the uplink is less than a predefined threshold, thereby indicating that the mobile terminal 10 may be within a central portion of the coverage area so as to permit data to be transmitted to the network entity within a smaller TTI.

With reference to block 42 of FIG. 3, the apparatus 20 embodied by the mobile terminal 10 may also include means, such as the processing circuitry 22, the processor 24 or the like, for detecting a failure condition associated with the uplink. The apparatus may also include means, such as the processing circuitry, the processor or the like, for selecting a second TTI resource, different than the first TTI resource, in response to the detection of the failure condition. See block 44.

Various failure conditions associated with the uplink may be defined in accordance with embodiments of the present invention. As illustrated in FIG. 4, for example, one failure condition may be the change in the power level of the preamble prior to the receipt of a successful acknowledgement (ACK) from the network entity 12 such that the power level of the preamble no longer satisfies the predefined threshold that was required for the initial selection of the first TTI resource. In this regard, the initial power $P_0$ with which the preamble is transmitted is shown by the leftmost bar in FIG. 4. As described above, this initial power $P_0$ with which the preamble is transmitted may be based upon the estimated interference and/or path loss along the uplink. Following transmission of the preamble having the initial power level $P_0$, the mobile terminal 10, such as the communications interface 28, the processing circuitry 22, the processor 24 or the like, may then await the receipt of a successful acknowledgement from the network entity, such as may be provided via an indicator channel, e.g., an enhanced acquisition indicator channel (E-AICH), prior to establishing a dedicated channel between the mobile terminal and the network entity to support the transmission of blocks of data.

In an instance in which the mobile terminal 10, such as the communication interface 28, the processing circuitry 22, the processor 24 or the like, fails to receive an acknowledgement, the apparatus 20 embodied by the mobile terminal, such as the communications interface, the processing circuitry, the processor or the like, may increase the power with which the preamble is transmitted by a predefined increment $\Delta P_0$. The apparatus embodied by the mobile terminal may then retransmit the preamble having an increased power level, such as a power defined as $P_0 + \Delta P_0$, as shown in FIG. 4. The apparatus embodied by the mobile terminal then again waits for the receipt of an acknowledgement from the network entity 12 of the successful receipt of the preamble having the increased power level. In an instance in which the apparatus embodied by the mobile terminal fails to receive such a successful acknowledgement from the network entity, the power with which the preamble is transmitted may be repeatedly increased, such as in steps of $\Delta P_0$, and the preamble may be retransmitted, albeit with an increasingly higher power level.

In accordance with an example embodiment, the apparatus 20 embodied by the mobile terminal 10, such as the processing circuitry 22, the processor 24 or the like, may determine an instance in which the power with which the preamble is retransmitted no longer satisfies the threshold that was required for the initial selection of the first TTI resource. As shown in the embodiment of FIG. 4, for example, the power level with which the preamble is retransmitted may be increased so as to exceed the predefined threshold that was required for the initial selection of the first TTI resource. In this embodiment, the change, such as the increase, in the power level with which the preamble is retransmitted prior to the receipt of a successful acknowledgement from the network entity 12 such that the power level of the preamble no longer satisfies the predefined threshold may be defined to be the failure condition that will, in turn, trigger selection of a different TTI resource.

Additionally or alternatively, a maximum number of retransmissions may be predefined. In this embodiment, such as shown in FIG. 5, the preamble may be repeatedly transmitted via the uplink with increasingly greater power level in instances in which the apparatus 20 embodied by the mobile terminal 10 fails to receive a successful acknowledgment from network entity 12. In this embodiment, the power level with which the preamble is transmitted may continue to satisfy the predefined threshold, such as by being less than the predefined threshold as shown in the embodiment of FIG. 5. However, the retransmission of the preamble with an increasingly greater power level for the predefined maximum number of times, e.g., 4 times in the embodiment of FIG. 5, without receipt of a successful acknowledgment from the network entity may be defined as the failure condition associated with the uplink that will, in turn, trigger selection of a different TTI resource.

In another embodiment, the transmission of the preamble from the mobile terminal 10 to the network entity 12 may be successfully acknowledged such that a channel, such as an E-DCH, is established between the mobile terminal and network entity with blocks of data being transmitted in accordance with the first TTI resource such as within 2 ms. As shown in FIG. 6, the failure condition of this embodiment may be an unrecoverable error in the uplink. As such, the apparatus 20 embodied by the mobile terminal, such as the processing circuitry 22, the processor 24, the communication interface 28 or the like, may be configured to detect an unrecoverable error in the uplink, such as a radio link control (RLC) unrecoverable error, a maximum number of hybrid automatic repeat request (HARQ) retransmissions or other unrecoverable error. Once the unrecoverable error in the uplink has been detected, the apparatus embodied by the mobile terminal, such as the processing circuitry, the processor or the like, may select a different TTI resource.

In yet another embodiment, the failure to receive a response from the network entity 12 in regards to an indication relating to the transition from the first TTI resource to a second TTI resource may serve as the failure condition. In this regard, the initial transmission of the preamble from the mobile terminal 10 to the network entity may be successfully acknowledged such that a channel, such as an E-DCH, is established between the mobile terminal and the network entity. While the channel remains established, the apparatus 20 embodied by the mobile terminal, such as the processing circuitry 22, the processor 24 or the like, may determine that predefined criteria that has been established for the selection of a different TTI resource may be met, as shown in FIG. 7. A variety of predefined criteria may be established to trigger the selection of a different TTI resource but, in one embodiment, the predefined criteria may be based on buffer occupancy, based on radio conditions, e.g., pathloss, interference, cell coverage, received signal code power, or based on the relationship of the channel quality index (CQI) to a predefined threshold.

In response to the determination that the predefined criteria for the selection of a different TTI resource has been met, the apparatus 20 embodied by the mobile terminal 10 of this embodiment, such as the processing circuitry 22, the processor 24, the communication interface 28 or the like, may cause an indication to be transmitted to the network entity 12 indicating that a transition is to be made from the first TTI resource to a second, different TTI resource, as shown in FIG. 7. Although various types of indications may be provided, the mobile terminal, such as the processing circuitry, the processor, the communication interface or the like, may provide a layer 1 (L1) CQI or layer 2 (L2) system information (SI) indication in one embodiment. In response to the indication regarding the impending transition from the first TTI resource to the second TTI resource, the apparatus embodied by the mobile terminal, such as the processing circuitry, the processor, the communication interface or the like, may await an acknowledgement from the network entity, such as a high speed-shared control channel (HS-SCCH) order from the network entity to switch to the second TTI resource. In this embodiment, the apparatus embodied by the mobile terminal, such as the processing circuitry, the processor, the communication interface or the like, may await the acknowledgement or other response from the network entity for a predefined period of time. In an instance as shown in FIG. 7 in which the acknowledgement or other response from the network entity is not received by the mobile terminal within the predefined period of time, the failure to have received the acknowledgment or other response from the network entity may be the failure condition associated with the uplink, thereby triggering the selection of the second TTI resource unilaterally by the mobile terminal even though the network entity did not acknowledge or otherwise respond to the prior indication relating to the transition from the first TTI resource to the second TTI resource.

Regardless of the manner in which the failure condition associated with the uplink is detected, the detection of the failure condition causes the apparatus 20 embodied by the mobile terminal 10, such as the processing circuitry 22, the processor 24 or the like, to select a second TTI resource, different than the first TTI resource. In one embodiment, the second TTI resource defines a greater time period than the first TTI resource. For example, the first TTI resource may define a time period of 2 ms, while the second TTI resource may define a time period of 10 ms. By reselecting a second TTI resource that defines a greater time period than the first TTI resource, the method, apparatus and computer program product of an example embodiment of the present invention provides a greater time period for transmitting a block of data via the uplink, thereby increasing the likelihood that the mobile terminal may successfully communicate with the network entity 12 even in an instance in which the mobile terminal is near an edge of the coverage area.

In addition to or instead of selecting a TTI resource that defines a longer period of time in response to the detection of the failure condition, the apparatus 20 embodied by the mobile terminal 10, such as the processing circuitry 22, the processor 24 or the like, may select a different type of TTI resource. For example, the first TTI resource that is selected in accordance with one embodiment may provide for normal operation in which a single block of data is transmitted via the uplink with the mobile terminal then awaiting acknowledgement by the network entity 12. In this embodiment, the apparatus embodied by the mobile terminal, such as the processing circuitry, the processor or the like, may select a second TTI resource in response to the detection of the failure condition in which the second TTI resource defines either the same or a different time period than the first TTI resource, but in which the second TTI resource implements a bundling operation in which the same block of data is transmitted a plurality of times, such as five or more times, via the uplink prior to awaiting receipt of an acknowledgement from the network entity, thereby increasing the likelihood that the network entity will successfully receive the data packet even in instances in which the mobile terminal is near an edge of the coverage area.

By reselecting the TTI resource in response to the detection of a failure condition while utilizing the first TTI resource, the reliability with which a mobile terminal 10 may transmit blocks of data to a network entity 12 via the uplink may be improved. However, the method, apparatus and computer program product of an example embodiment do endeavor to take advantage of a shorter TTI resource when network conditions permit so as to increase the rate at which data is transmitted from the mobile terminal to the network entity and to correspondingly increase network utilization, while still being able to automatically adapt to changing conditions, such as movement of the mobile terminal from a central portion of the coverage area to an edge of the coverage area, or to correct for errors associated with the initial selection of the first TTI resource by automatically reselecting a different TTI resource in response to the detection of a failure condition.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   at a mobile terminal communicating with a network entity in a wireless network,
      selecting a first transmission time interval (TTI) resource in conjunction with an uplink;
      detecting a failure condition associated with the uplink; and
      selecting a second TTI resource, different than the first TTI resource, in response to detection of the failure condition,
   wherein the failure condition is detected by at least one of:
      detecting a change in it power level of it retransmission of a preamble prior to receipt of a successful acknowledgement from the network entity such that the power level of the retransmission of the preamble no longer satisfies a predefined threshold;
      detecting that the preamble has been retransmitted at least a predefined number of times prior to receipt of the successful acknowledgement from the network entity; and
      detecting an unrecoverable error in the uplink.

2. The method according to claim 1 wherein the second TTI resource defines a greater time period than the first TTI resource.

3. The method according to claim 2 wherein the first and second TTI resources define respective time periods of 2 ms and 10 ms.

4. The method according to claim 1 wherein the second TTI resource relies upon bundling of data packets on the uplink.

5. The method according to claim 1 wherein selecting the first TTI resource comprises determining that the power level of the preamble of data packets transmitted via the uplink satisfies the predefined threshold, and wherein detecting the failure condition comprises detecting the change in the power level of the retransmission of the preamble prior to receipt of the successful acknowledgement from the network entity such that the power level of the retransmission of the preamble no longer satisfies the predefined threshold.

6. The method according to claim 1 wherein detecting the failure condition comprises detecting that the preamble has been retransmitted at least the predefined number of times prior to receipt of the successful acknowledgement from the network entity.

7. The method according to claim 1 wherein detecting the failure condition comprises detecting the unrecoverable error in the uplink.

8. The method according to claim 1 further comprising causing an indication to be transmitted to the network entity indicating a transition from the first TTI resource to the second TTI resource, wherein detecting the failure condition comprises failing to receive a response from the network entity in regards to the indication regarding the transition from the first TTI resource to the second TTI resource.

9. An apparatus for controlling a mobile terminal in communication with a network entity in a wireless network, the apparatus comprising:
at least one processor; and at least one memory including computer program code, wherein the at least one memory and the computer program code are configured to, with the at least one processor, cause the mobile terminal to at least:
select a first transmission time interval (TTI) resource in conjunction with an uplink;
detect a failure condition associated with the uplink; and
select a second TTI resource, different than the first TTI resource, in response to detection of the failure condition,
wherein the failure condition is detected by at least one of:
detecting a change in a power level of a retransmission of a preamble prior to receipt of a successful acknowledgement from the network entity such that the power level of the retransmission of the preambles no longer satisfies a predefined threshold;
detecting that the preamble has been retransmitted at least a predefined number of times prior to receipt of the successful acknowledgement from the network entity; and
detecting an unrecoverable error in the uplink.

10. The apparatus according to claim 9 wherein the second TTI resource defines a greater time period than the first TTI resource.

11. The apparatus according to claim 10 wherein the first and second TTI resources define respective time periods of 2 ms and 10 ms.

12. The apparatus according to claim 9 wherein the second TTI resource relies upon bundling of data packets on the uplink.

13. The apparatus according to claim 9 wherein the at least one memory and the computer program code are configured to, with the at least one processor, cause the mobile terminal to select the first TTI resource by determining that the power level of the preamble of data packets transmitted via the uplink satisfies the predefined threshold, and wherein the at least one memory and the computer program code are configured to, with the at least one processor, cause the mobile terminal to detect the failure condition by detecting the change in the power level of a retransmission of the preamble prior to receipt of a successful acknowledgement from the network entity such that the power level of the retransmission of the preamble no longer satisfies the predefined threshold.

14. The apparatus according to claim 9 wherein the at least one memory and the computer program code are configured to, with the at least one processor, cause the mobile terminal to detect the failure condition by detecting that the preamble has been retransmitted at least the predefined number of times prior to receipt of the successful acknowledgement from the network entity.

15. The apparatus according to claim 9 wherein the at least one memory and the computer program code are configured to, with the at least one processor, cause the mobile terminal to detect the failure condition by detecting the unrecoverable error in the uplink.

16. The apparatus according to claim 9 the at least one memory and the computer program code are further configured to, with the at least one processor, cause the mobile terminal to transmit an indication to the network entity indicating a transition from the first TTI resource to the second TTI resource, wherein the at least one memory and the computer program code are configured to, with the at least one processor, cause the mobile terminal to detect the failure condition by failing to receive a response from the network entity in regards to the indication regarding the transition from the first TTI resource to the second TTI resource.

17. A computer program product comprising at least one non-transitory computer-readable storage medium having computer-readable program instructions stored therein with the computer-readable program instructions comprising program instructions configured to cause a mobile terminal, in communication with a network entity in a wireless network, to:
select a first transmission time interval (TTI) resource in conjunction with an uplink;
detect a failure condition associated with the uplink; and
select a second TTI resource, different than the first TTI resource, in response to detection of the failure condition,
wherein the failure condition is detected by at least one of:
detecting a change in a power level of a retransmission of a preamble prior to receipt of a successful acknowledgement from the network entity such that the power level of the retransmission of the preamble no longer satisfies a predefined threshold,
detecting that the preamble has been retransmitted at least a predefined number of times prior to receipt of the successful acknowledgement from the network entity; and
detecting an unrecoverable error in the uplink.

18. The computer program product according to claim 17 wherein the second TTI resource defines a greater time period than the first TTI resource.

19. The computer program product according to claim 18 wherein the first and second TTI resources define respective time periods of 2 ms and 10 ms.

20. The computer program product according to claim 17 wherein the second TTI resource relies upon bundling of data packets on the uplink.

21. The computer program product according to claim 17 wherein the program instructions configured to select the first TTI resource comprise program instructions configured to determine that the power level of the preamble of data packets transmitted via the uplink satisfies the predefined threshold, and wherein the program instructions configured to detect the failure condition comprise program instructions configured to detect the change in the power level of a retransmission of the preamble prior to receipt of a successful acknowledgement from the network entity such that the power level of the retransmission of the preamble no longer satisfies the predefined threshold.

22. The computer program product according to claim 17 wherein the program instructions configured to detect the failure condition comprise program instructions configured to detect that the preamble has been retransmitted at least a predefined number of times prior to receipt of a successful acknowledgement from a network entity.

23. The computer program product according to claim 17 wherein the program instructions configured to detect the failure condition comprise program instructions configured to detect an unrecoverable error in the uplink.

24. The computer program product according to claim 17 further comprising program instructions configured to cause an indication to be transmitted to the network entity indicating a transition from the first TTI resource to the second TTI resource, wherein the program instructions configured to detect the failure condition comprise program instructions configured to recognize a failure to receive a response from the network entity in regards to the indication regarding the transition from the first TTI resource to the second TTI resource.

* * * * *

UNITED STATES PATENT AND TRADEMARK OFFICE
CERTIFICATE OF CORRECTION

PATENT NO. : 8,837,311 B2
APPLICATION NO. : 13/291634
DATED : September 16, 2014
INVENTOR(S) : Brian Martin et al.

Page 1 of 1

It is certified that error appears in the above-identified patent and that said Letters Patent is hereby corrected as shown below:

In the Claims

Claim 1, column 12, line 32 through 33: Replace "detecting a change in it power level of it retransmission" with --detecting a change in a power level of a retransmission--.

Claim 9, column 13, line 27: Replace "the retransmission of the preambles no longer satisfies" with --the retransmission of the preamble no longer satisfies--.

Signed and Sealed this
Twenty-fourth Day of March, 2015

Michelle K. Lee
*Director of the United States Patent and Trademark Office*